US012794033B2

(12) United States Patent
Hickey et al.

(10) Patent No.: US 12,794,033 B2
(45) Date of Patent: Nov. 10, 2026

(54) BATTERY CELL ASSEMBLIES, THERMAL MANAGEMENT SYSTEMS, AND CONTROL LOGIC WITH CELL-LEVEL INTERNAL COOLING

(71) Applicant: GM GLOBAL TECHNOLOGY OPERATIONS LLC, Detroit, MI (US)

(72) Inventors: Ryan P. Hickey, Royal Oak, MI (US); Taylor R. Garrick, Bloomfield Hills, MI (US); Phillip D. Hamelin, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 964 days.

(21) Appl. No.: 18/079,366

(22) Filed: Dec. 12, 2022

(65) Prior Publication Data

US 2024/0194963 A1 Jun. 13, 2024

(51) Int. Cl.
*H01M 10/613* (2014.01)
*H01M 10/625* (2014.01)
(Continued)

(52) U.S. Cl.
CPC ....... *H01M 10/613* (2015.04); *H01M 10/625* (2015.04); *H01M 10/6555* (2015.04);
(Continued)

(58) Field of Classification Search
CPC ............. H01M 10/613; H01M 10/625; H01M 10/6555; H01M 10/6556; H01M 10/647;
(Continued)

(56) References Cited

U.S. PATENT DOCUMENTS 4,350,026 A 9/1982 Klein
6,889,515 B2 5/2005 Tilton et al.
(Continued)

FOREIGN PATENT DOCUMENTS

DE 102008034880 A1 * 6/2009 .......... H01M 50/213

OTHER PUBLICATIONS

English Translation of DE-102008034880-A1 (Year: 2009).*
(Continued)

*Primary Examiner* — Niki Bakhtiari
*Assistant Examiner* — Madison Leigh Kyle
(74) *Attorney, Agent, or Firm* — Quinn IP Law

(57) ABSTRACT

Presented are thermal management systems with cell-level internal cooling for multicell battery assemblies, methods for making/using such systems, and vehicles equipped with such systems. A battery assembly includes one or more battery cells located inside a battery housing. Each battery cell includes a cell case with a coolant tube located inside the cell case and opening through a case wall. A cold plate assembly, which is located inside the battery housing and attached to the battery cell(s), includes stacked first and second plates, a coolant intake shaft projecting from the first plate into the coolant tube, and a coolant exhaust shaft projecting from the second plate into the coolant intake shaft and coolant tube. The cold plate assembly circulates coolant between the stacked plates, into each cell case via the coolant tube and coolant intake shaft, and out of each cell case via the coolant tube and coolant exhaust shaft.

20 Claims, 4 Drawing Sheets

(51) Int. Cl.
*H01M 10/6555* (2014.01)
*H01M 10/6556* (2014.01)
*H01M 50/204* (2021.01)

(52) U.S. Cl.
CPC ..... *H01M 10/6556* (2015.04); *H01M 50/204* (2021.01); *H01M 2220/20* (2013.01)

(58) Field of Classification Search
CPC ......... H01M 10/6557; H01M 10/6554; H01M 10/6567; H01M 50/204; H01M 50/249; H01M 2220/20; Y02E 60/10
See application file for complete search history.

(56) References Cited

U.S. PATENT DOCUMENTS

| | | | | |
|---|---|---|---|---|
| 6,955,063 | B2 | 10/2005 | Adiga et al. | |
| 8,329,325 | B2 | 12/2012 | Brodie et al. | |
| 8,383,260 | B2 | 2/2013 | Essinger et al. | |
| 8,435,668 | B2 | 5/2013 | Kumar et al. | |
| 8,563,154 | B2 | 10/2013 | Graban et al. | |
| 8,852,772 | B2 | 10/2014 | McDonald | |
| 10,003,112 | B1 | 6/2018 | Boor et al. | |
| 10,923,287 | B1 | 2/2021 | Coppola et al. | |
| 11,387,505 | B2 | 7/2022 | Hickey et al. | |
| 11,450,920 | B2 | 9/2022 | Hamelin et al. | |
| 2005/0181272 | A1* | 8/2005 | Kim | H01M 50/3425<br>429/185 |
| 2009/0249807 | A1 | 10/2009 | Nemesh et al. | |
| 2011/0200860 | A1 | 8/2011 | Brodie et al. | |
| 2017/0005382 | A1* | 1/2017 | Kim | H01M 10/0431 |
| 2017/0331142 | A1* | 11/2017 | Nicholls | H01M 10/654 |
| 2019/0357386 | A1 | 11/2019 | Coppola et al. | |
| 2020/0388893 | A1 | 12/2020 | Schoenherr et al. | |
| 2022/0102780 | A1 | 3/2022 | Hickey et al. | |
| 2022/0223936 | A1 | 7/2022 | Garrick et al. | |

OTHER PUBLICATIONS

U.S. Appl. No. 17/870,150, filed Jul. 22, 2022, First Inventor: Taylor R. Garrick, Assignee: GM Global Technology Operations LLC.

* cited by examiner

BATTERY CELL ASSEMBLIES, THERMAL MANAGEMENT SYSTEMS, AND CONTROL LOGIC WITH CELL-LEVEL INTERNAL COOLING

INTRODUCTION

The present disclosure relates generally to electrochemical devices. More specifically, aspects of this disclosure relate to thermal management systems for regulating the operating temperatures of battery cells in rechargeable, multicell battery assemblies.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle at desired speeds for desired ranges, contemporary traction battery packs group multiple battery cells (e.g., 8-16+ cells/stack) into individual battery modules (e.g., 10-40+ modules/pack) that are electrically interconnected in series or parallel and mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). A high-frequency bulk capacitor may be arranged across the positive and negative terminals of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

The individual cells of a battery pack may generate a significant amount of heat during the pack's charge and discharge cycles. This cell-borne heat is produced primarily by exothermic chemical reactions and losses due to activation energy, chemical transport, and resistance to ionic migration. Within lithium-ion batteries, a series of exothermic and gas-generating reactions may take place as cell temperatures rise that may push the battery assembly towards an unstable state. Such thermal events, if left unchecked, may lead to a more accelerated heat-generating state called "thermal runaway", a condition in which the battery system is unable to return the internal battery components to normal operating temperatures. An integrated battery cooling system may be employed to prevent these undesirable overheating conditions within such battery packs. Active thermal management (ATM) systems, for example, employ a central controller or dedicated control module to regulate operation of a cooling circuit that circulates coolant fluid through the heat-producing battery components. For indirect liquid cooling systems, a heat-transfer coolant is circulated through a network of internal channels, plates, and pipes within the battery case. In contrast, direct liquid cooling systems—or "liquid immersion cooling" (LIC)—immerse the battery cells/modules within a direct-conduction dielectric liquid coolant.

SUMMARY

Presented herein are thermal management systems with cell-level internal cooling features for battery assemblies, methods for making and methods for operating such systems, and electric-drive vehicles equipped with such systems for cooling the vehicles' battery packs. In an example, a battery pack contains parallel rows of electrically interconnected prismatic or cylindrical battery cells that are mounted onto a bipartite cold plate assembly. Each cell includes at least two electrically conductive working electrodes, an ion-conducting electrolyte material, and a permeable separator sheet, all of which are enclosed inside an electrically insulated case. In a "jelly roll" design, a separator sheet is stacked between each pair of working electrodes, an insulator sheet is laid on the stack, and the stack is then rolled and sealed in the cell case.

To enable internal cooling of the battery cell, the jelly roll is impaled on a blind-hole type central spool (or "coolant tube"), which is integral with and opens through a bottom wall of the cell case while projecting vertically upward into the case's internal compartment. This central spool sheathes onto a hollow coolant rod (or "coolant intake shaft") that projects upward from and is integral with a top plate of the cold plate assembly. At the same time, the coolant rod nests therein a hollow exhaust shaft (or "coolant exhaust shaft") that projects upward from and is integral with a bottom plate of the cold plate assembly. During battery cell charge/discharge, coolant fluid flows between the top and bottom plates of the cold plate assembly, travels up through a gap between the coolant rod and the exhaust shaft, is diverted from the coolant rod into the exhaust shaft via a hemispherical cap at the end of the rod, and is expelled from the central spool of the cell case through the exhaust shaft and an exhaust channel in the bottom cold plate.

Attendant benefits for at least some of the disclosed concepts include battery assemblies with cell-level internal coolant flow conduits for enhanced active cell cooling performance. Circulating coolant fluid through the cell case's central spool and the cold plate assembly's coolant rod and exhaust shaft increases heat removal and drives towards temperature uniformity in the cell, e.g., in extreme use cases, such as during direct-current fast charging (DCFC), track driving, thermal runaway (TR), etc. In addition, the cold plate assembly with integral coolant rods facilitates cell alignment and mounting during battery pack assembly. In addition to improved cell performance and simplified pack assembly, cooling efficacy is improved with a concomitant increase in battery capacity, which leads to improvements in overall vehicle efficiency and increased driving range.

Aspects of this disclosure are directed to thermal management systems with cell-level internal cooling features for regulating cell operating temperatures in battery assemblies, including both automotive and non-automotive applications alike. In an example, there is presented a battery assembly that is fabricated with a protective and insulative battery housing that contains one or more battery cells, such as lithium-class prismatic or cylindrical battery cells. Each battery cell includes a respective cell case with a coolant tube, which is located inside the cell case and opens through one of the cell case walls. A cold plate assembly is also located inside the battery housing and is physically attached to the battery cell(s). The cold plate assembly includes a stacked pair of (first and second) plates, a first coolant shaft projecting from the first plate into the coolant tube of the cell case, and a second coolant shaft projecting from the second plate into the first coolant shaft and into the coolant tube. The cold plate assembly circulates coolant fluid between the stacked cold plates, into the cell case via the coolant tube and one of the coolant shafts, and out of the cell case via the coolant tube and the other one of the coolant shafts.

Additional aspects of this disclosure are directed to motor vehicles with thermal management systems for cooling lithium-class traction battery packs. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles, motorcycles, farm equipment, watercraft, aircraft, e-bikes, etc. For non-automotive applications, disclosed concepts may be implemented for any logically relevant use, including stand-alone power stations and portable power packs, photovoltaic systems, pumping equipment, machine tools, server systems, etc. While not per se limited, disclosed concepts may be particularly advantageous for use with lithium-class prismatic and cylindrical battery cells.

In an example, a motor vehicle includes a vehicle body with a passenger compartment, multiple road wheels mounted to the vehicle body (e.g., via corner modules coupled to a unibody or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to propel the vehicle. A rechargeable traction battery pack is mounted onto the vehicle body and operable to power the traction motor(s). In addition to the battery pack and traction motor, the vehicle includes other heat-generating devices that may be cooled by disclosed in-vehicle thermal management systems.

Continuing with the preceding discussion, the vehicle's traction battery pack includes a protective battery pack housing that contains multiple rows of electrically interconnected, lithium-class battery cells. Each battery cell includes a respective cell case that encloses therein at least one rolled cell stack. A rolled cell stack is generally composed of stacked working electrodes, a separator sheet inserted between each pair of the working electrodes, and a solid, liquid, or quasi-solid electrolyte. Each cell case includes at least one cell case wall that is integral with an elongated coolant tube. This coolant tube projects into the cell case, mounts thereon the rolled cell stack, and opens through the cell case wall. Also located inside the pack housing is a cold plate assembly that mounts thereon the row(s) of battery cells. The cold plate assembly includes a top cold plate stacked on a bottom cold plate, multiple coolant feed shafts integral with and projecting from the top cold plate into the coolant tubes of the cell cases, and multiple coolant exhaust shafts integral with and projecting from the bottom cold plate into the coolant feed shafts and the coolant tubes. The cold plate assembly selectively circulates coolant between the stacked cold plates, into each of the cell cases via its coolant tube and a respective coolant feed shaft, and out of each cell case via its coolant tube and a respective coolant exhaust shaft.

Aspects of this disclosure are also directed to manufacturing workflow processes, computer-readable media, and control logic for making or for using any of the disclosed thermal management systems, battery assemblies, and/or motor vehicles. In an example, a method is presented for constructing a battery assembly. This representative method includes, in any order and in any combination with any of the above and below disclosed options and features: receiving a battery housing; locating a battery cell in the battery housing, the battery cell including a cell case having a case wall and a coolant tube, the coolant tube extending into the cell case and opening through the case wall; locating a cold plate assembly inside the battery housing, the cold plate assembly including a first plate, a second plate stacked with the first plate, a first coolant shaft projecting from the first plate into the coolant tube, and a second coolant shaft projecting from the second plate into the first coolant shaft and the coolant tube; and attaching the battery cell to the cold plate assembly such that the cold plate assembly is operable to circulate coolant between the first and second plates, into the cell case via the coolant tube and one of the coolant shafts, and out of the cell case via the coolant tube and the other one of the coolant shafts.

For any of the disclosed battery assemblies, methods, and vehicles, a battery cell may contain a single rolled cell stack or multiple rolled cell stacks, each of which is located in the cell case and includes multiple electrodes, a separator sheet sandwiched between each mated pair of electrodes, and an ion-conducting electrolyte in contact with the electrodes. For some applications, a rolled cell stack may be mounted on and surround the cell case's coolant tube; in this instance, the coolant tube may be a hollow, right-circular cylinder with one closed end. Alternatively, the coolant tube may be sandwiched between multiple rolled cell stacks; in this instance, the coolant tube may be a hollow rectangular polyhedron with a closed upper end and flat or rounded lateral ends.

For any of the disclosed battery assemblies, methods, and vehicles, the coolant tube and the case wall may be integrally formed with a thermally conductive material as a unitary, single-piece structure. As another option, the coolant tube may define therein a blind hole that projects substantially orthogonally from a central region of the case wall. In this instance, the cell case may have a cylindrical or prismatic geometry with a vertical case height; the blind hole extends through the center of the cell case and has a vertical hole length that extends approximately 70-95% of the case height.

For any of the disclosed battery assemblies, methods, and vehicles, the first coolant shaft and the first plate may be integrally formed with a thermally conductive material as a unitary, single-piece structure. As another option, the first coolant shaft may define therein a blind hole that projects substantially orthogonally from and, at the same time, opens through the first plate. In this instance, a first (bottom) end of the first coolant shaft opens through the first plate, and a second (top) end of the first coolant shaft, opposite the first end, includes a hemispherical end cap. This end cap contains a toroidal diverter channel that diverts flow of the coolant fluid from the first coolant shaft into the second coolant shaft, or vice versa.

For any of the disclosed battery assemblies, methods, and vehicles, the second coolant shaft and the second plate may be integrally formed with a thermally conductive material as a unitary, single-piece structure. Optionally, the second coolant shaft may define therethrough a through hole that projects substantially orthogonally from and, at the same time, opens through the second plate. In this instance, the through hole of the second coolant shaft may extend all the way through the second plate, the first plate, and the case wall; the through hole of the second coolant shaft may terminate proximal a terminal end of the first coolant shaft. As another option, the first cold plate may be substantially parallel to and vertically spaced from the second cold plate. In this instance, the cold plate assembly includes a coolant inlet channel, which is located between opposing faces of the stacked cold plates, and a coolant exhaust channel, which is located inside the second cold plate.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
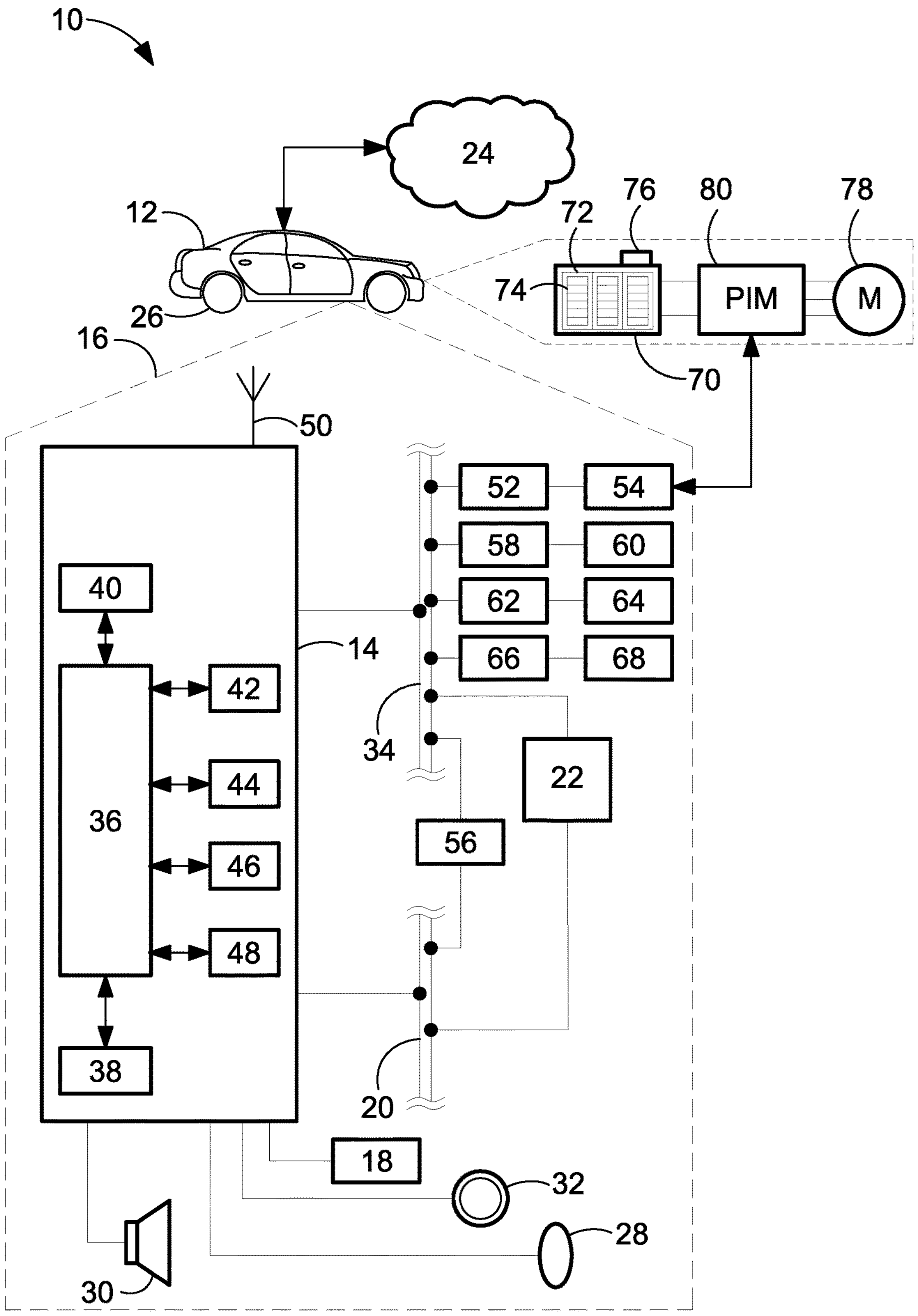
FIG. 1 is a partially schematic, side-view illustration of a representative motor vehicle with an electrified powertrain, a rechargeable traction battery pack, and a thermal management system with cell-level internal cooling features for regulating the operating temperatures of the cells in the battery pack in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Discussed below are electrochemical battery cell designs that integrate internal coolant flow features within the cell case for improved thermal management of the battery system. By way of example, each cell case—including cylindrical and prismatic cell form factors—contains one or more fluid conduits that circulate coolant fluid into and out of the cell case's internal compartment to increase heat removal and drive towards temperature uniformity in each cell during extreme use cases, such as DCFC, track, TR, etc. To facilitate improved cell-level cooling, the battery system may employ a cold plate design with integrated coolant flow rods or blades (collectively "shafts") for injecting/exhausting coolant fluid into/out of each cell case to thereby remove heat from the center of the cell's jelly roll. During manufacture of the battery assembly, these cold plate coolant shafts facilitate cell alignment and mounting within the battery housing. In prismatic cell formats, disclosed cell-level internal coolant flow conduits may help increase a TR activation time for a single cell that, in turn, reduces the thermal affect on the pack-level system.

To enable coolant flow vertically upward and downward (Z-height) within the battery cells, the battery system may employ a multilayer cold plate assembly with a dedicated coolant rod (cylindrical cells) or coolant blade (prismatic cells) for each cell. The cell case may incorporate internal (or external) threads that mate with complementary external (or internal) threads on the topmost cold plate to secure each cell in place, i.e., allowing for a rigid mounting of the cells directly onto the cold plate assembly. The cold plate assembly's coolant intake/exhaust shafts may also help to control cell positioning and maintain cell-to-cell spacing. For battery cell configurations in which a single cell contains multiple jelly rolls, the coolant shaft may take on the form of a hollow barrier wall or "blade" that extends into the center of the cell case in order to physically separate the rolls to act as a TR speed dampener. In particular, the internally located coolant-flow blade helps to slow down monocell-to-monocell heat propagation throughout the individual cell, resulting in a slower energy release to the pack. Disclosed multilayer cold plate designs may also enable coolant flow into and out of the cells in a parallel fluid flow architecture. During thermal runaway, if one cell experiences a "vapor lock" that prevents internal cooling of that cell, coolant flow is able to continue for other cells in the battery assembly.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which novel aspects of this disclosure may be practiced. In the same vein, incorporation of the present concepts into an FEV powertrain should be appreciated as a non-limiting implementation of disclosed features. As such, it will be understood that aspects and features of this disclosure may be applied to other powertrain architectures, incorporated into any logically relevant type of motor vehicle, and utilized for both automotive and non-automotive applications alike. Moreover, only select components of the motor vehicles and battery assemblies are shown and described in additional detail herein. Nevertheless, the vehicles and assemblies discussed below may include numerous additional and alternative features, and other available peripheral components, for carrying out the various methods and functions of this disclosure.

The representative vehicle 10 of FIG. 1 is originally equipped with a centerstack telecommunications and information ("telematics") unit 14 that wirelessly communicates, e.g., via cell towers, base stations, mobile switching centers, satellite service, etc., with a remotely located cloud computing host service 24 (e.g., ONSTAR®). Some of the other in-vehicle hardware components 16 shown in FIG. 1 include, as non-limiting examples, an electronic video display device 18, a microphone 28, audio speakers 30, and assorted user input controls 32 (e.g., buttons, knobs, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with means to input verbal or other auditory commands. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is the network connection interface 34, suitable examples of which include twisted pair/fiber optic Ethernet switches, parallel/serial communications buses, local area network (LAN) interfaces, controller area network (CAN) interfaces, and the like. The network connection interface 34 enables vehicle hardware 16 to send and receive signals with one another and with various systems and subsystems both onboard and off-board the vehicle body 12. This allows the vehicle 10 to perform assorted vehicle functions, such as modulating powertrain output, activating friction and regenerative brake systems, controlling vehicle steering, regulating charge and discharge of a vehicle battery pack, and other automated functions. For instance, telematics unit 14 may receive and transmit signals to/from a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with off-board devices may be provided via one or more or all of a cellular chipset/component, a navigation and location chipset/component (e.g., global positioning system (GPS) transceiver), or a wireless modem, all of which are collectively represented at 44. Short-range communication (SRC) may be provided via a close-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components or, optionally, may include additional components and functionality as desired for a particular end use. The communications devices described above may provision data exchanges as part of a periodic broadcast in a vehicle-to-vehicle (V2V) communication system or a vehicle-to-everything (V2X) communication system.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of autonomous vehicle operation.

To propel the motor vehicle 10, an electrified powertrain is operable to generate and deliver tractive torque to one or more of the vehicle's drive wheels 26. The powertrain is generally represented in FIG. 1 by an electric traction motor 78 that is operatively connected to a rechargeable energy storage system (RESS), which may be in the nature of a chassis-mounted traction battery pack 70. The traction battery pack 70 is generally composed of one or more battery modules 72 each containing a group of electrochemical battery cells 74, such as lithium ion, lithium polymer, or nickel metal hydride battery cells of the pouch, can, or prismatic type. One or more electric machines, such as traction motor/generator (M) units 78, draw electrical power from and, optionally, deliver electrical power to the battery pack 70. A power inverter module (PIM) 80 electrically connects the battery pack 70 to the motor/generator unit(s) 78 and modulates the transfer of electrical current therebetween. The battery pack 70 may be configured such that module management, cell sensing, and module-to-module or module-to-host communications functionality is integrated directly into each module 72 and performed wirelessly via a wireless-enabled cell monitoring unit (CMU) 76.

Figure 2:
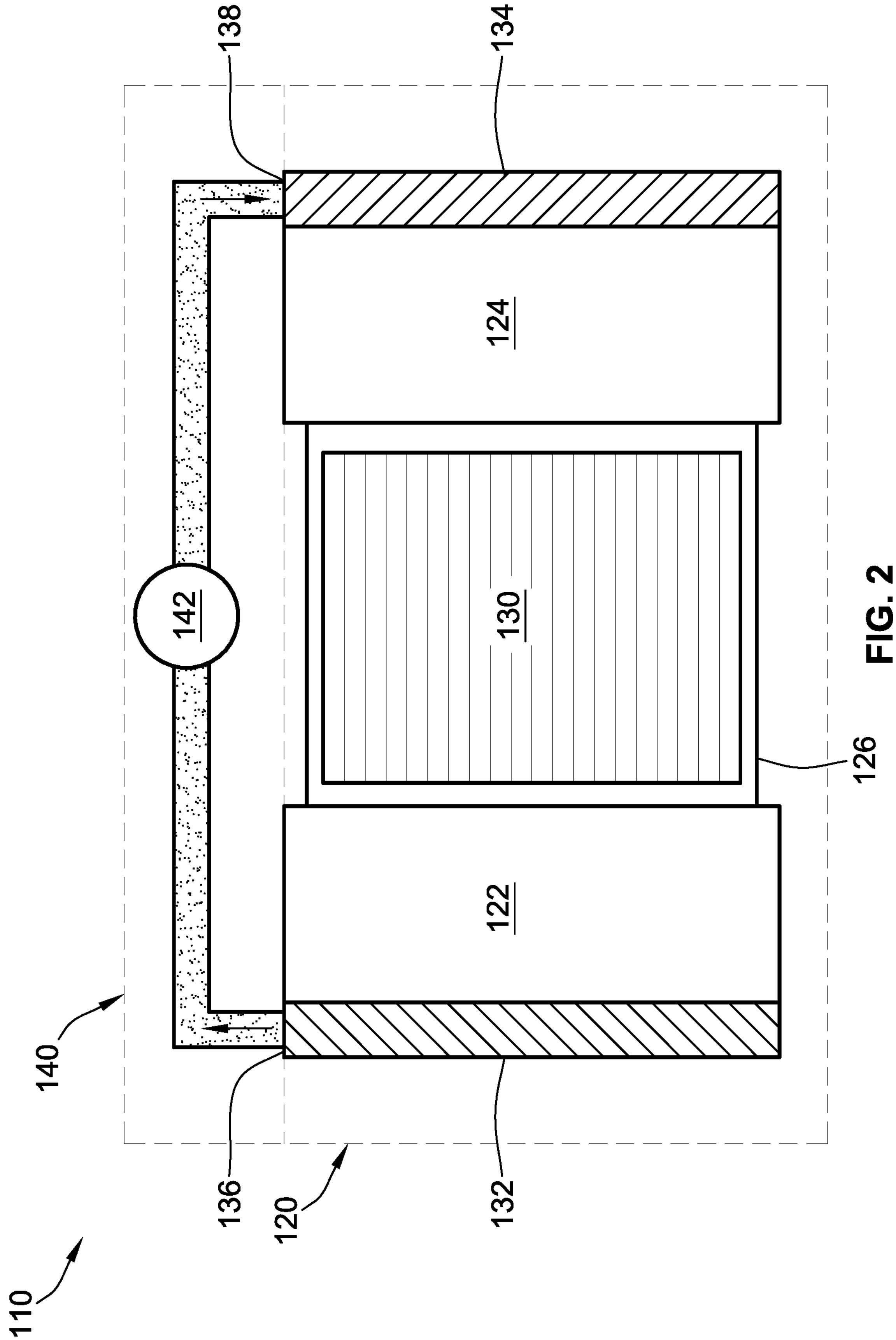
FIG. 2 is a schematic illustration of a representative electrochemical device with which aspects of the present disclosure may be practiced.

Presented in FIG. 2 is an exemplary electrochemical device in the form of a rechargeable lithium-class battery 110 that powers a desired electrical load, such as motor 78 of FIG. 1. Battery 110 includes a series of electrically conductive electrodes, namely a first (negative or anode) working electrode 122 and a second (positive or cathode) working electrode 124 that are stacked and packaged inside a protective outer housing 120. Reference to either working electrode 122, 124 as an "anode" or "cathode" or, for that matter, as "positive" or "negative" does not limit the electrodes 122, 124 to a particular polarity as the system polarity may change depending on whether the battery 110 is being operated in a charge mode or a discharge mode. In at least some configurations, the cell housing 120 (or "cell case") may take on a can-like cylindrical construction or a box-like prismatic construction that is formed of aluminum, nickel-plated steel, ABS, PVC, or other suitable material or composite material. The internal and external surfaces of a metallic cell casing may be coated with a polymeric finish to insulate the metal from internal cell elements and from adjacent cells. Although FIG. 2 illustrates a single galvanic monocell unit enclosed within the cell housing 120, it should be appreciated that the housing 120 may stow therein a stack of monocell units (e.g., five to five hundred cells or more).

Anode electrode 122 may be fabricated with an active anode electrode material that is capable of incorporating lithium ions during a battery charging operation and releasing lithium ions during a battery discharging operation. For at least some designs, the anode electrode 122 is manufactured, in whole or in part, from a lithium metal, such as lithium-aluminum (LiAl) alloy materials with an Li/Al atomic ratio in a range from 0 at. %≤Li/Al<70 at. %, and/or aluminum alloys with Al atomic ratio >50 at. % (e.g., lithium metal is smelt). Additional examples of suitable active anode electrode materials include carbonaceous materials (e.g., graphite, hard carbon, soft carbon etc.), silicon, silicon-carbon blended materials (silicon-graphite composite), $Li_4Ti_5O_{12}$, transition-metals (alloy types, e.g., Sn), metal oxide/sulfides (e.g., $SnO_2$, FeS and the like), etc.

With continuing reference to FIG. 2, cathode electrode 124 may be fabricated with an active cathode electrode material that is capable of supplying lithium ions during a battery charging operation and incorporating lithium ions during a battery discharging operation. The cathode 124 material may include, for instance, lithium transition metal oxide, phosphate (including olivines), or silicate, such as $LiMO_2$ (M=Co, Ni, Mn, or combinations thereof); $LiM_2O_4$ (M=Mn, Ti, or combinations thereof), $LiMPO_4$ (M=Fe, Mn, Co, or combinations thereof), and LiMxM'2-xO4 (M, M'=Mn or Ni). Additional non-limiting examples of suitable active cathode electrode materials include lithium nickel cobalt manganese oxide (NCM), lithium nickel cobalt aluminum oxide (NCA), lithium nickel cobalt manganese aluminum oxide (NCMA), and other lithium transition-metal oxides.

Disposed inside the battery cell housing 120 of FIG. 2, between each neighboring pair of electrodes 122, 124, is a porous separator 126. The porous separator 126 may be in the nature of an electrically non-conductive, ion-transporting microporous or nanoporous polymeric separator sheet. Separator 126 may be a sheet-like structure that is composed of a porous polyolefin membrane, e.g., with a porosity of about 35% to about 65% and a thickness of approximately 10-30 microns. Electrically non-conductive ceramic particles (e.g., silica) may be coated onto the porous membrane surfaces of the separators 126. The porous separator 126 may incorporate a non-aqueous fluid electrolyte composition and/or solid electrolyte composition, collectively designated 130, which may also be present in the negative electrode 122 and the positive electrode 124.

A negative electrode current collector 132 of the electrochemical battery cell 110 may be positioned on or near the negative electrode 122, and a positive electrode current collector 134 may be positioned on or near the positive electrode 124. The negative electrode current collector 132 and positive electrode current collector 134 respectively collect and move free electrons to and from an external circuit 140. An interruptible external circuit 140 with a load 142 connects to the negative electrode 122, through its respective current collector 132 and electrode tab 136, and to the positive electrode 124, through its respective current collector 134 and electrode tab 138.

The porous separator 126 may operate as both an electrical insulator and a mechanical support structure by being sandwiched between the two electrodes 122, 124 to prevent the electrodes from physically contacting each other and, thus, the occurrence of a short circuit. In addition to providing a physical barrier between the electrodes 122, 124, the separator 126 may provide a minimal resistance path for internal passage of lithium ions (and related anions) during cycling of the lithium ions to facilitate functioning of the battery 110. For some configurations, the porous separator 126 may be a microporous polymeric separator including a polyolefin. The polyolefin may be a homopolymer, which is derived from a single monomer constituent, or a heteropolymer, which is derived from more than one monomer constituent, and may be either linear or branched. In a solid-state battery, the role of the separator may be partially/fully provided by a solid electrolyte layer.

Operating as a rechargeable energy storage system, battery 110 generates electric current that is transmitted to one or more loads 142 operatively connected to the external circuit 140. While the load 142 may be any number of electric devices, a few non-limiting examples of power-consuming load devices include electric motors for hybrid and full-electric vehicles, laptop and tablet computers, cellular smartphones, cordless power tools and appliances, portable power stations, etc. The battery 110 may include a variety of other components that, while not depicted herein for simplicity and brevity, are nonetheless readily available. For instance, the battery 110 may include one or more gaskets, terminal caps, tabs, battery terminals, cooling hardware, charging hardware, and other commercially available components or materials that may be situated on or in the battery 110. Moreover, the size and shape and operating characteristics of the battery 110 may vary depending on the particular application for which it is designed.

Figure 3:
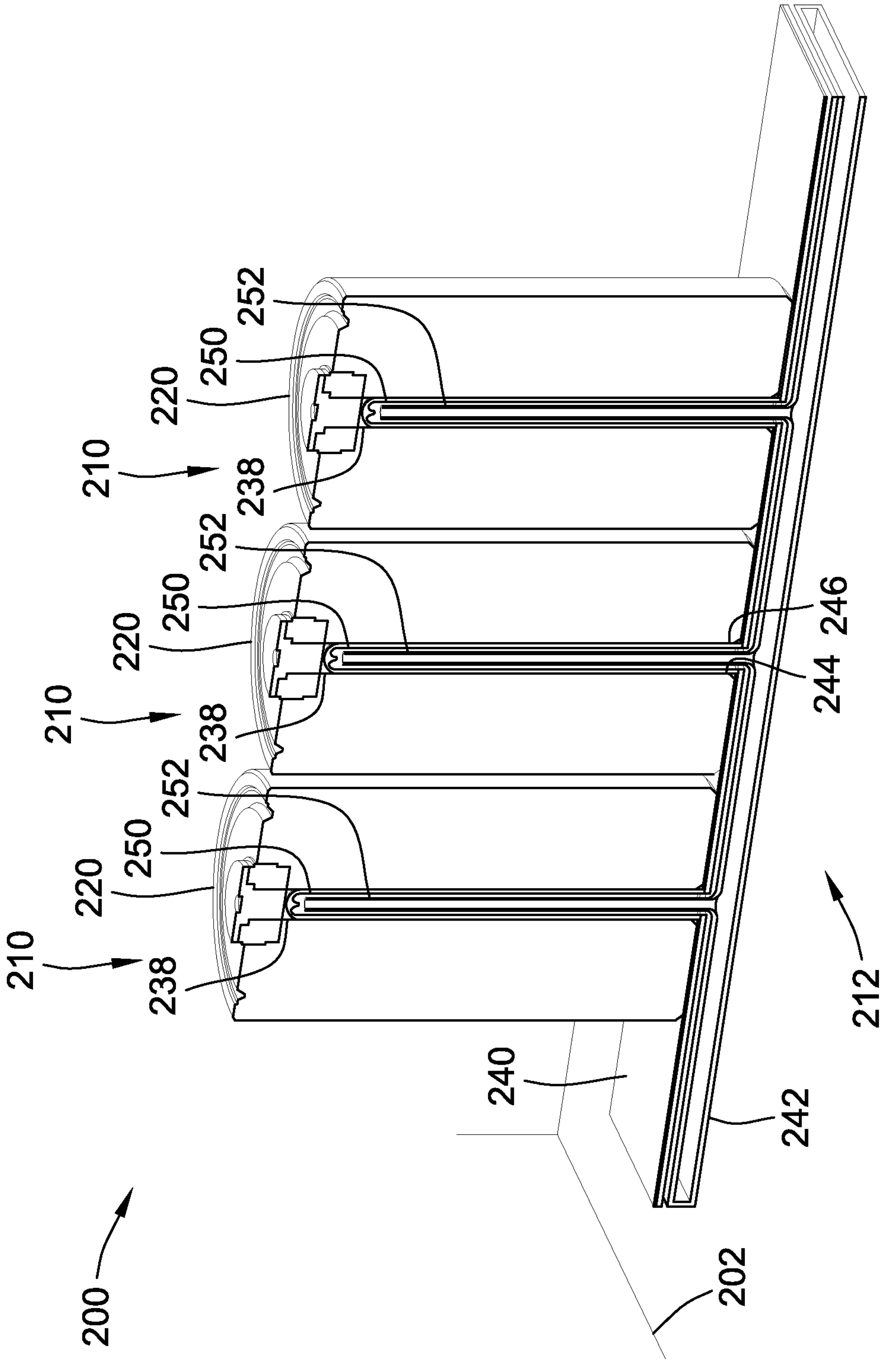
FIG. 3 is a sectional, perspective-view illustration of select components of a representative battery assembly with a thermal management system using a multilayer cold plate assembly with cell-mounting coolant rods that feed coolant fluid into internal central spools of each protective cell case in accord with aspects of the present disclosure.
Figure 4:
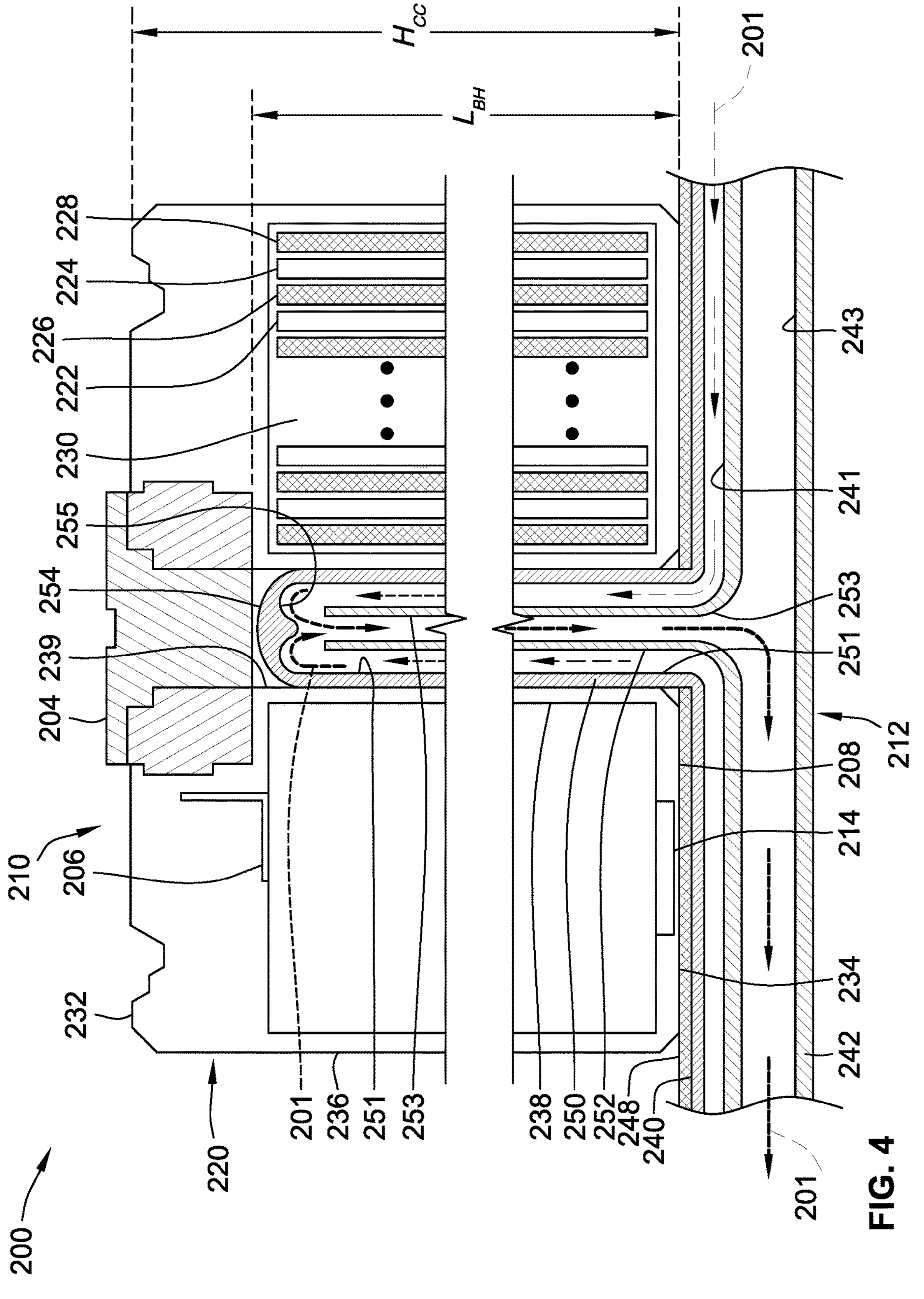
FIG. 4 is an enlarged sectional, side-view illustration of one of the battery cells mounted onto the multilayer cold plate assembly of FIG. 3 showing cell-level internal coolant flow through the battery cell case.

Turning next to FIGS. 3 and 4, there is shown another non-limiting example of a battery assembly 200 that is adapted for storing and supplying high-voltage electrical energy used, for example, to propel an electric-drive vehicle, such as the all-electric automobile 10 of FIG. 1. This battery assembly 200 may be representative of a deep-cycle, high-ampere capacity vehicle battery system that is rated for approximately 350 to 800 high-voltage direct current (HVDC) or more, for example, depending on a desired vehicle range, gross vehicle weight, and power ratings of the various accessory loads drawing electrical power from the RESS. Although differing in appearance, it is envisioned that any of the features and options described above with reference to the battery pack 70 of FIG. 1 and the lithium-class battery cell 110 of FIG. 2 can be incorporated, singly or in any combination, into the battery assembly 200 of FIG. 3, and vice versa. As a representative point of similarity to the traction battery pack 70 if FIG. 1, for example, the battery assembly 200 of FIG. 3 includes a protective, electrically insulating battery assembly housing 202 that contains one or more battery cells, three of which are shown as lithium-class cylindrical (secondary) battery cells 210. These battery cells 210 may be arranged in a rectangular array of mutually parallel cell rows and physically mounted onto a bipartite cold plate assembly 212. The housing 202 may be constructed in assorted shapes and sizes using metallic, polymeric, or fiber-reinforced polymer (FRP) materials, including combinations and composites thereof, to satisfy various mechanical, manufacturing, packaging, and thermal design specifications.

A representative point of similarity between the battery cells 210 of FIGS. 3 and 4 and battery cell 110 of FIG. 2 includes a protective cell case 220 that contains one or more monocell stacks. As best seen in FIG. 4, each cell case 220 contains two or more mated pairs of negative and positive working electrodes 222 and 224, a respective separator sheet 226 interleaved between each of the mated pairs of stacked electrodes 222, 224, and an insulator sheet 228 wrapped around the outer periphery of the stacked electrodes and separators. Also stored inside the cell case 220 is an ion-conducting electrolyte 230 that may be in solid form (e.g., solid state diffusion), liquid form (e.g., liquid phase diffusion), or quasi-solid form (e.g., solid electrolyte entrained within a liquid carrier). In the illustrated example, the stacked electrodes 222, 224, separator sheets 226, and insulator sheet 228 are tightly rolled into a helically wound cylinder or "jelly roll". It should be appreciated that the battery cells 210 may contain a single cell stack wound into a cylindrical jelly roll, as shown, or may contain a prismatic-wound "flat" jelly roll or multiple rolled cell stacks enclosed within a single cell case 220.

Located at a top end of the cell case 220 is a positive cell terminal 204 that electrically connects via a positive terminal lead 206 to the cathode electrode(s) 224. Located at a bottom end of the cell case 220, opposite that of the positive terminal 204, is a negative terminal lead 208 that electrically connects via a negative terminal lead 214 to the anode electrode(s) 222. Top and bottom insulator pads (not shown) may be inserted between the longitudinal ends of the jelly roll and the interior faces of the cell terminals 204, 206. Other available features that may be incorporated into the battery cells 210 include gaskets, current interrupters, gas vents, spacers, etc. A thermal interface material (TIM) layer 248 may be disposed on and cover the cell-side top face of the top cold plate 240 to enhance the amount of thermal energy pulled into the cold plate assembly 212.

To improve active cell cooling during charge and discharge cycles of the battery cells 210, the battery assembly 200 employs cell-level internal coolant flow features for circulating coolant fluid 201 through the interior of each cell case 220. For at least some applications, the coolant fluid 201 is a non-corrosive, chemically inert and non-toxic liquid with a high thermal capacity and a low viscosity. In accord with the example illustrated in FIG. 4, each cell case 220 is fabricated with multiple interconnected cell case walls, including a top wall or cap 232 located at an upper longitudinal end of the case 220, a bottom wall or plate 234 located at a lower longitudinal end of the case 220, and one or more lateral sidewalls f extending between and adjoining the top and bottom walls 232, 234. It should be appreciated that the cell case 220 may take on other regular and irregular geometric configurations, may include greater or fewer than the three illustrated sidewalls, and may be constructed using various techniques from an assortment of suitable materials.

Located inside the cell case 220 is a blind-hole type central spool 238 (also referred to herein as "coolant tube") that attaches to and opens through the cell case's bottom wall 234. It may be desirable, e.g., for simplicity of design and assembly, that the central spool 238 and bottom case wall 234 be integrally formed from a thermally conductive metallic material as a unitary, single-piece structure. To allow coolant fluid 201 to flow into and out of the battery cell 210 through a single end of the cell case 220, the central spool 238 delineates an internal blind hole 239 (see FIG. 4) that is open at a bottom end thereof, closed off at a top end thereof, and projects substantially orthogonally from a central region of the bottom wall 236. This blind hole 239 may be an elongated, rectilinear coolant flow channel that extends through the center of the cell case 220. As shown, the blind hole 239 has a vertical hole length LBH that extends at least 70% of or, in some system designs, between 90-95% of a vertical case height Her of the cell case 220. To facilitate heat extraction from the center of the rolled electrodes 222 and 224, the jelly roll is mounted directly onto and surrounds the central spool 238. The spool 238 may be centrally located on and integrated with a bottom case wall, as shown, or may be positioned at other locations and/or integrated with other case walls within the scope of this disclosure.

With continuing reference to both FIGS. 3 and 4, the cold plate assembly 212 is packaged inside the battery assembly housing 202, subjacent the rectangular array of battery cells 210. In contrast to traditional battery pack designs that employ a single cold plate or one cold plate at each opposing end of the cells, the cold plate assembly 212 may be generally typified as a bipartite construction with a top (first) cold plate 240 that is stacked on a bottom (second) cold plate 242, with both stacked plates 240, 242 located adjacent a bottom end of the battery cells 210. To rigidly secure the battery cells 210 onto the cold plate assembly 212, each cell case 220 may include internal (or external) threads 244, e.g., that extend into the blind hole 239 (or around the periphery of the case 220), and threadably mate with external (or internal) threads 246, e.g., that extend around the base of the coolant shaft 250 (or from the top plate 240). It is also within the scope of this disclosure to employ adhesives, fasteners, mounting brackets, gaskets, seals, etc., to operatively attach the battery cells 220 to the cold plate assembly 212. Moreover, it is plausible that the multilayer cold plate assembly 212 be located above or on one or more sides of the cell array for other battery assembly configurations.

To facilitate active thermal management of the battery assembly 200, the cold plate assembly 212 selectively circulates metered amounts of coolant fluid 201 throughout the battery assembly housing 202 and into each of the battery cells 210. By way of example, and not limitation, the top plate 240 may be a predominantly flat panel structure that is substantially parallel to and vertically spaced from the bottom plate 242, which may be a predominantly flat box-like structure. With this arrangement, the cold plate assembly 212 receives chilled and pressurized coolant fluid 201 via a coolant inlet channel 241 (FIG. 4) that is located between the two cold plates 240, 242. The cold plate assembly 212 evacuates heated fluid 201 from the battery cells 210 and battery assembly 200 via a coolant exhaust channel 243 that is located within the bottom cold plate 242. It is envisioned that the top and bottom cold plates 240, 242 may be substantially flat, as shown, or may take on contoured shapes, whereas the cold plate assembly 212 may include more than the two illustrated cold plates.

Chilled coolant fluid 201 received by the cold plate assembly 212 is fed into the individual battery cells 210 of the battery assembly 200 via the top cold plate 240. According to the representative architecture of FIGS. 3 and 4, a rectangular array of hollow coolant rods 250 (also referred to herein as "coolant intake shafts") projects vertically upward from a cell-side face of the top cold plate 240. Each coolant rod 250 is portrayed as a hollow, right-circular cylinder that inserts into and is surrounded by a respective one the central spools 238. It may be desirable, e.g., for simplicity of design and assembly, that the coolant rods 250 and top cold plate 240 be integrally formed from a thermally conductive metallic material as a unitary, single-piece structure. To allow coolant fluid 201 to flow into the battery cells 210, each coolant rod 250 of FIG. 4 contains a blind hole 251 hat projects substantially orthogonally from the top plate 240 and terminates proximate the terminal top end of the central spool's blind hole 239. A bottommost end of the coolant rod 250 opens through the top cold plate 240 to thereby receive incoming coolant fluid 201 from the coolant inlet channel 241. A topmost end of the coolant rod 250, opposite that of the plate 240, is closed off by a hemispherical end cap 254. The end cap 254 contains a toroidal diverter channel 255 that redirects flow of the coolant fluid 201 from the coolant rod 250 into a mating coolant exhaust shaft 252.

Heated coolant fluid 201 is evacuated from the individual battery cells 210 via the bottom cold plate 242 of the cold plate assembly 212. Continuing with the illustrated example, a rectangular array of hollow exhaust shafts 252 (also referred to herein as "coolant exhaust shaft") projects vertically upward from a top face of the bottom cold plate 242. Each exhaust shaft 252 is portrayed as a hollow, right-circular cylinder that inserts into a respective one of the coolant rod 250 and into a respective one of the central spools 238 such that the exhaust shaft 252 is surrounded by the coolant rod 250. It may be desirable, e.g., for simplicity of design and assembly, that the exhaust shafts 252 and bottom cold plate 242 be integrally formed from a thermally conductive metallic material as a unitary, single-piece structure. To allow coolant fluid 201 to flow out of the battery cells 210, each coolant exhaust shaft 252 of FIG. 4 contains a through hole 253 that projects substantially orthogonally from the bottom plate 240 and opens proximate the end cap 254 at a terminal top end of the coolant rod's blind hole 251. As best seen in FIG. 4, the through hole 253 extends through the bottom plate 242, the top plate 240, and the cell case's bottom wall 234 and terminates proximal a terminal end of the coolant rod 250.

During active cooling of the battery assembly 200, the cold plate assembly 212 receives and circulates coolant fluid 201 into the inlet channel 241 between the stacked cold plates 240, 242. From there, coolant fluid 201 is injected into the individual cell cases 220 through the coolant-receiving central spools 238 via the coolant rods 250. After reaching the tops of the coolant rods 250, the coolant fluid 201 is diverted by the diverter channels 255 of the end caps 254 into the exhaust shafts 252. Coolant 201 flows down through the exhaust shafts 252 and out of the central spools 238 of the cell cases 220; at this juncture, the heated coolant fluid 201 is expelled from the battery assembly housing 202 via the exhaust channel 243 in the bottom cold plate 242.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A battery assembly comprising:

a battery housing;

a battery cell located in the battery housing and including a cell case, the cell case having a case wall integrally formed with a coolant tube as a single-piece wall structure, the coolant tube extending into the cell case and opening through the case wall; and a cold plate assembly located inside the battery housing and attached to the battery cell, the cold plate assembly including:

a first plate integrally formed with a first coolant shaft as a first single-piece plate structure, the first coolant shaft projecting outward from the first plate into the coolant tube, and a second plate stacked with the first plate, the second plate integrally formed with a second coolant shaft as a second single-piece plate structure, the second coolant shaft projecting outward from the second plate into the first coolant shaft and the coolant tube, wherein the cold plate assembly is configured to circulate coolant fluid between the first and second plates, into the cell case via the coolant tube and one of the first and second coolant shafts, and out of the cell case via the coolant tube and the other one of the first and second coolant shafts.

2. The battery assembly of claim 1, wherein the battery cell further includes a rolled cell stack located in the cell case and having multiple electrodes, a separator sheet between the electrodes, and an electrolyte, the rolled cell stack mounted on and surrounding the coolant tube.

3. The battery assembly of claim 1, wherein the coolant tube is a hollow, right-circular cylinder projecting substantially orthogonally from the case wall.

4. The battery assembly of claim 1, wherein the coolant tube defines therein a blind hole projecting substantially orthogonally from a central region of the case wall.

5. The battery assembly of claim 4, wherein the cell case is cylindrical or prismatic and has a case height, and wherein the blind hole extends through a center of the cell case and has a hole length extending at least 70% of the case height.

6. The battery assembly of claim 1, wherein the first coolant shaft is a hollow, right-circular cylinder projecting substantially orthogonally from the first plate.

7. The battery assembly of claim 1, wherein the first coolant shaft defines therein a blind hole projecting substantially orthogonally from and opening through the first plate.

8. The battery assembly of claim 7, wherein a first end of the first coolant shaft opens through the first plate, and a second end of the first coolant shaft, opposite the first end, includes a hemispherical cap defining therein a toroidal diverter channel configured to divert flow of the coolant fluid from the first coolant shaft into the second coolant shaft.

9. The battery assembly of claim 1, wherein the second coolant shaft is a hollow, right-circular cylinder projecting substantially orthogonally from the second plate.

10. The battery assembly of claim 1, wherein the second coolant shaft defines therethrough a through hole projecting substantially orthogonally from and opening through the second plate.

11. The battery assembly of claim 10, wherein the through hole of the second coolant shaft extends through the second plate, the first plate, and the case wall and terminates proximal a terminal end of the first coolant shaft.

12. The battery assembly of claim 1, wherein the first plate is substantially parallel to and vertically spaced from the second plate.

13. The battery assembly of claim 12, wherein the cold plate assembly further includes a coolant inlet channel located between the first and second plates, and a coolant exhaust channel located within the second plate.

14. A motor vehicle, comprising:

a vehicle body with a passenger compartment;

a plurality of road wheels attached to the vehicle body;

a traction motor attached to the vehicle body and operable to drive one or more of the road wheels to thereby propel the motor vehicle; and a traction battery pack attached to the vehicle body and electrically connected to the traction motor, the traction battery pack including:

a pack housing;

a row of battery cells located inside the pack housing and electrically coupled to one another, each of the battery cells including a cell case enclosing therein a rolled cell stack with multiple electrodes, a separator sheet stacked between the electrodes, and an electrolyte, each of the cell cases including a case wall integrally formed with an elongated coolant tube as a single-piece wall structure, the coolant tube projecting into the cell case, mounting thereon the rolled cell stack, and opening through the case wall; and a cold plate assembly located inside the pack housing and mounting thereon the row of battery cells, the cold plate assembly including a first plate, a top second plate stacking thereon the first plate, multiple coolant feed shafts integrally formed as a first single-piece plate structure with and projecting from the first plate into the coolant tubes of the cell cases, and multiple coolant exhaust shafts integrally formed as a second single-piece plate structure with and projecting from the second plate into the coolant feed shafts and the coolant tubes, wherein the cold plate assembly is configured to circulate coolant fluid between the top and bottom plates, into the cell cases via the coolant tubes and the coolant feed shafts, and out of the cell cases via the coolant exhaust shafts.

15. A method of constructing a battery assembly, the method comprising:

receiving a battery housing;

locating a battery cell in the battery housing, the battery cell including a cell case having a case wall integral with a coolant tube as a single-piece wall structure, the coolant tube extending into the cell case and opening through the case wall;

locating a cold plate assembly inside the battery housing, the cold plate assembly including:

a first plate integral with a first coolant shaft as a first single-piece plate structure, the first coolant shaft projecting outward from the first plate and configured to insert into the coolant tube, and a second plate stacked with the first plate, the second plate integral with a second coolant shaft as a second single-piece plate structure, the second coolant shaft projecting outward from the second plate into the first coolant shaft, the second coolant shaft configured to insert into the coolant tube; and attaching the battery cell to the cold plate assembly with the first and second coolant shafts inserted into the coolant tube such that the cold plate assembly is operable to circulate coolant fluid between the first and second plates, into the cell case via the coolant tube and one of the coolant shafts, and out of the cell case via the coolant tube and the other one of the coolant shafts.

16. The method of claim 15, wherein the battery cell further includes a rolled cell stack located in the cell case and having multiple electrodes, a separator sheet stacked between the electrodes, and an electrolyte, wherein the rolled cell stack is mounted on and surrounds the coolant tube.

17. The method of claim 15, further comprising integrally forming the coolant tube with the case wall as the single-piece wall structure, the coolant tube defining therein a blind hole projecting substantially orthogonally from a central region of the case wall.

18. The method of claim 15, further comprising integrally forming the first coolant shaft with the first plate as the first single-piece structure, the first coolant shaft defining therein a blind hole projecting substantially orthogonally from and opening through the first plate.

19. The method of claim 15, further comprising integrally forming the second coolant shaft with the second plate as the second single-piece structure, the second coolant shaft defining therethrough a through hole projecting substantially orthogonally from and opening through the second plate.

20. The method of claim 15, wherein locating the cold plate assembly inside the battery housing includes locating the first plate substantially parallel to and vertically spaced from the second plate, and wherein the cold plate assembly further includes a coolant inlet channel located between the first and second plates, and a coolant exhaust channel located within the second plate.

* * * * *